April 8, 1958 R. B. LAMBERT 2,830,173
FLASHLIGHT
Filed April 20, 1955 4 Sheets-Sheet 1
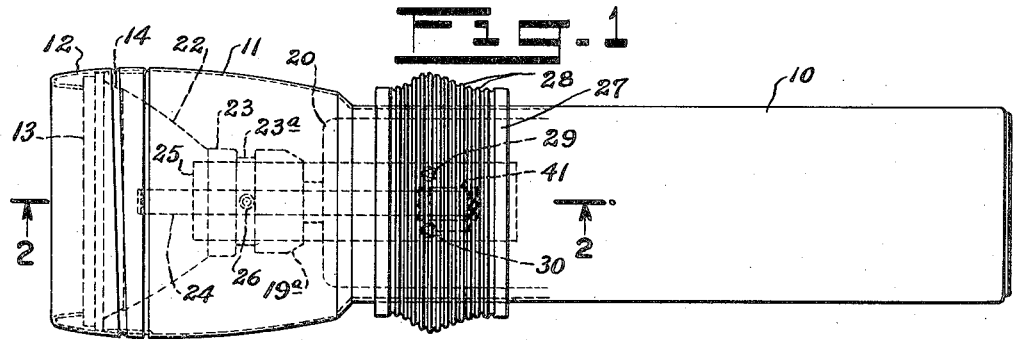
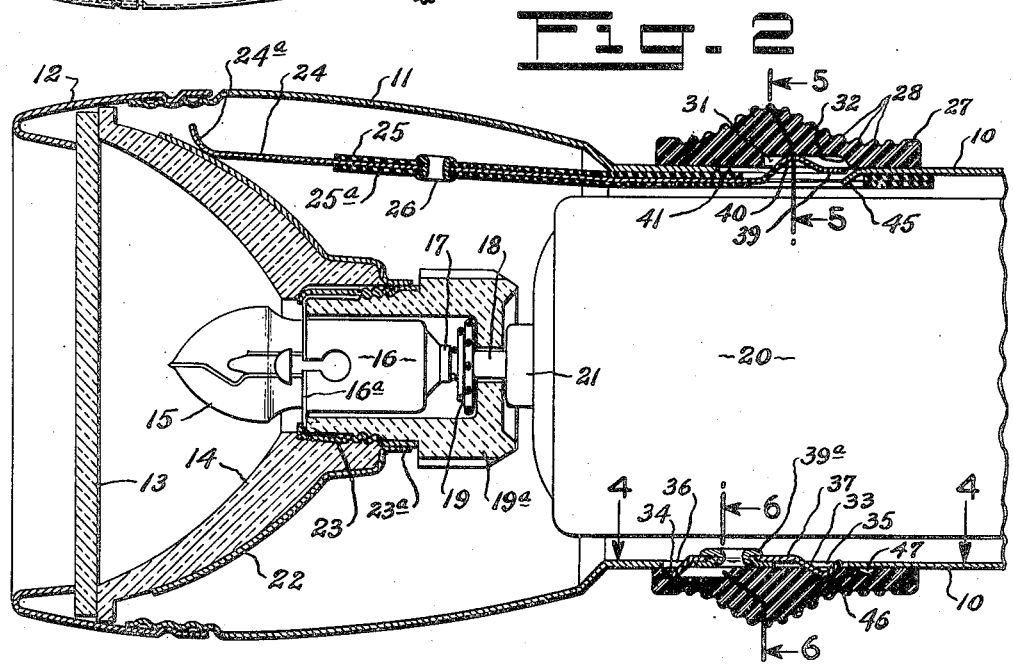
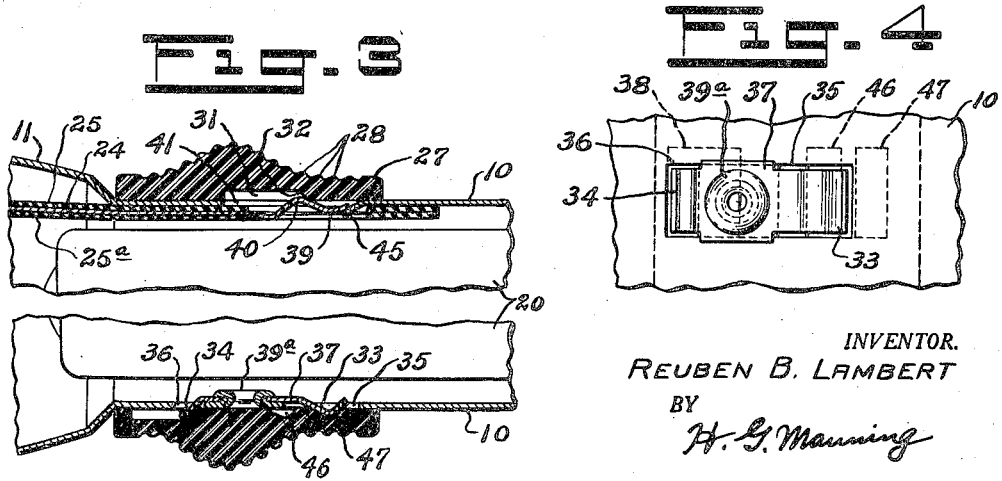
INVENTOR.
REUBEN B. LAMBERT
BY
H. G. Manning
ATTORNEY

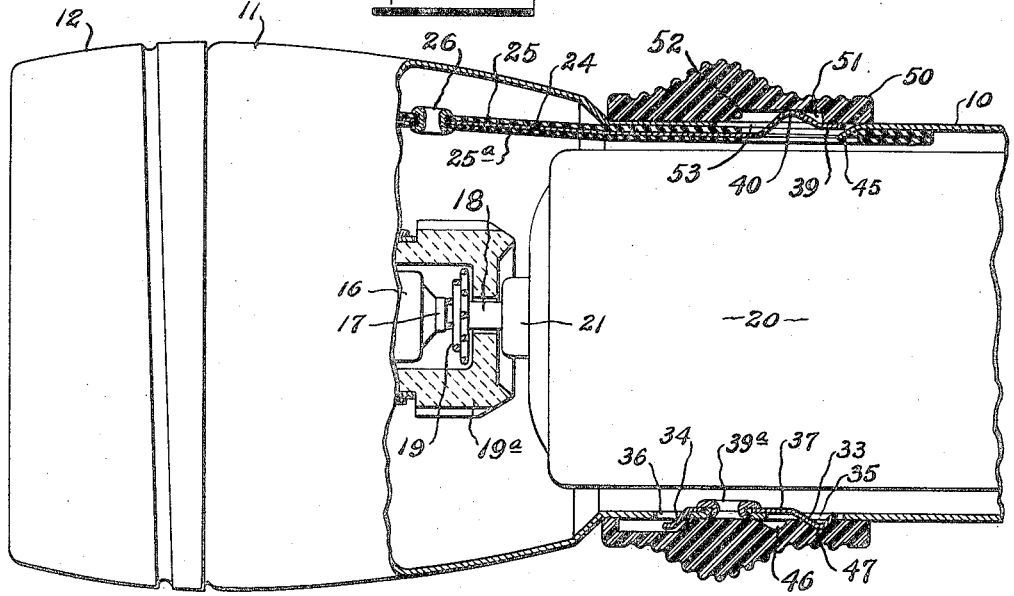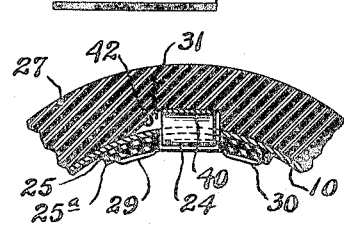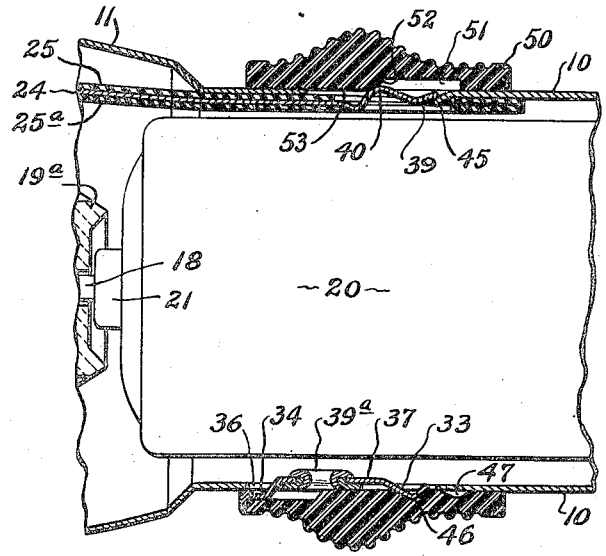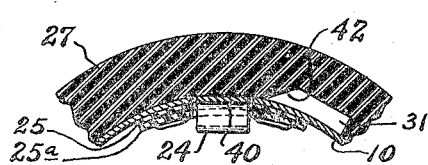

April 8, 1958     R. B. LAMBERT     2,830,173
FLASHLIGHT
Filed April 20, 1955     4 Sheets-Sheet 3
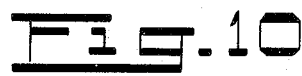
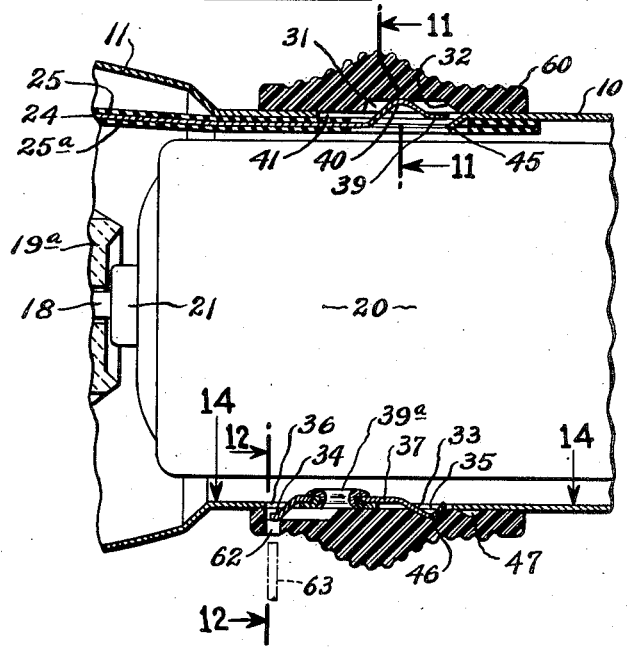
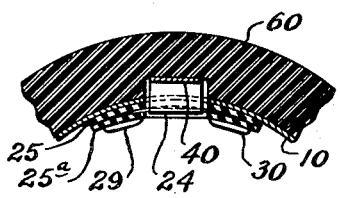
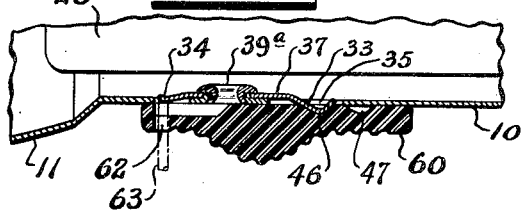
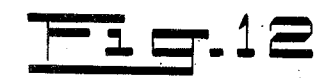
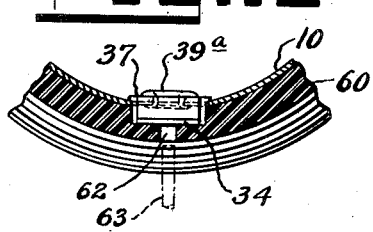
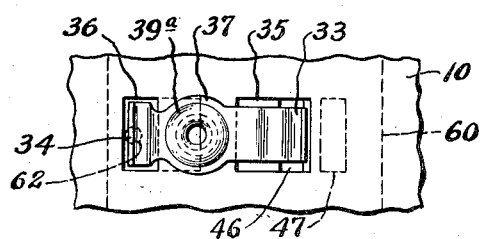
INVENTOR.
REUBEN B. LAMBERT
BY
H. G. Manning
ATTORNEY

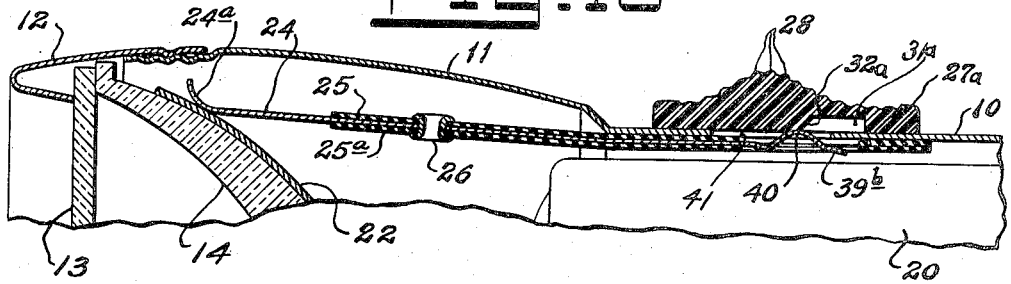
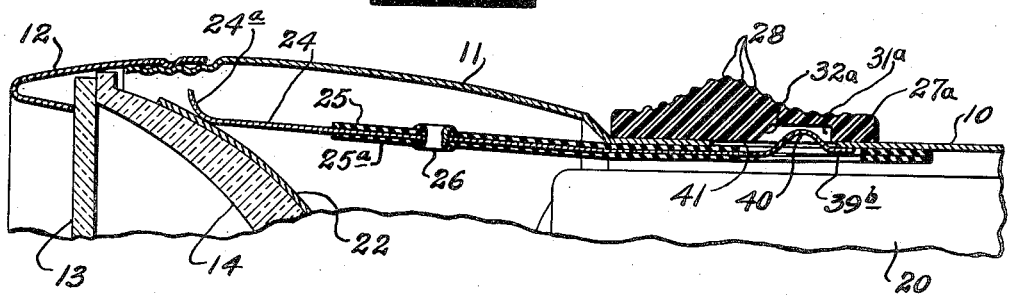

United States Patent Office 2,830,173
Patented Apr. 8, 1958

2,830,173

FLASHLIGHT

Reuben B. Lambert, Terryville, Conn.

Application April 20, 1955, Serial No. 502,561

10 Claims. (Cl. 240—10.66)

This invention relates to flashlights or electric torches, and more particularly to a dry battery-operated flashlight having a longitudinally slidable non-conducting plastic switch ring.

One object of the present invention is to provide a device of the above nature which will be simple in construction, inexpensive to manufacture, easy to install and manipulate, compact, ornamental in appearance, and very efficient and durable in use.

With these and other objects in view there has been illustrated on the accompanying drawings, three forms in which the invention may conveniently be embodied in practice.

In the drawings,

Fig. 1 represents a side view of the first form of the flashlight embodying the invention.

Fig. 2 is a longitudinal sectional view, on an enlarged scale, of the forward part of the flashlight showing the switch ring in "off" position, the section being taken along the line 2—2 of Fig. 1.

Fig. 3 is a fragmentary exploded view showing two longitudinal sections of the ring switch and the locking lugs in "on" position.

Fig. 4 is a plan view of a portion of the flashlight casing showing the locking lug in "off" position, taken from the inside of the casing from the line 4—4 of Fig. 2.

Fig. 5 is a fragmentary cross-sectional view of a portion of the switch ring and flashlight casing, taken along the line 5—5 of Fig. 2 showing the switch contact in "off" position.

Fig. 6 is a fragmentary cross-sectional view, taken along the line 6—6 of Fig. 2, of the locking lug when the flashlight switch is in "off" position.

Fig. 7 is a cross-sectional view of the same, similar to Fig. 5, showing the locking lug after it has been rotated out of the locking slot in the interior of the switch ring, permitting the removal of said ring longitudinally from the casing.

Fig. 8 is a cross-sectional view, on an enlarged scale, showing a portion of a second form of flashlight embodying the invention, in which the switch may be closed by moving the switch ring rearwardly—said switch ring being shown in its forward "off" position.

Fig. 9 is a fragmentary cross-sectional view of a portion of the same, showing the switch ring in its closed rearward position, and also showing the locking lug seated in its forward locking groove.

Fig. 10 is a fragmentary cross-sectional view of a third form of flashlight, in which the switch ring may be removed from the casing after the locking lug has been pushed inwardly through a hole in the casing by means of a suitable tool.

Fig. 11 is a cross-sectional view, taken along the broken line 11—11 of Fig. 10 showing the switch open.

Fig. 12 is a cross-sectional view of the same, taken along the line 12—12 of Fig. 10 showing the locking lug.

Fig. 13 is a fragmentary longitudinal sectional view through the locking lug, showing the method of inserting the tool through the unlocking hole, with the locking lug in released position.

Fig. 14 is an inside plan view of a portion of the casing showing the locking lug with its attaching rivet, taken along the line 14—14 of Fig. 10.

Fig. 15 is a fragmentary longitudinal sectional view similar to Fig. 2 of the forward portion of a flashlight having a modified form of outwardly urged spring switch strip, shown in "off" position.

Fig. 16 is a similar sectional view showing the plastic switch operating ring after it has been moved forwardly on the casing to permit the spring strip to move into "on" position.

Referrring now to the drawings, in which like reference numerals denote corresponding parts throughout the several views, the improved flashlight or electric torch includes a metallic casing 10 having an enlarged head 11 integral therewith at its forward end.

Provision is also made of a detachable bezel screw ring 12 for holding a flat glass circular crystal 13 tightly against the forward end of a plastic reflector 14 having a detachable bulb 15 located at the central portion of the parabolic surface thereof.

The bulb 15 is adapted to be received within the interior of a metallic cylindrical shell 16 having a forward outwardly extending flange 16a, said bulb having a rear end contact 17 for engaging a conical coil spring 19, as clearly shown in Fig. 2 of the drawing. The spring 19 rests upon a tubular conductive eyelet 18 located in the bottom of a cup-shaped insulating base 19a seated in the center of the reflector 14.

The flashlight bulb 15 is adapted to be energized by a plurality of dry cells 20, each of which is provided with a forward terminal contact 21 for engagement with the eyelet conductor 18 or the conductive base of the adjacent dry cell, as the case may be.

The exterior of the reflector 14 is provided with a cup-shaped conductive shell 22 having a cylindrical reduced rear end 23a for tightly engaging the rear of a cylindrical conductive shell 23, surrounding the insulating base 19a.

Provision is also made of an elongated longitudinal conductive metallic spring strip 24 having an out-curled forward end 24a which is adapted to lie in permanent resilient engagement with the forward portion of the exterior conductive shell 22 behind the reflector 14.

The spring strip 24 is mounted between a pair of flat, elongated insulating strips 25, 25a to which it is rigidly secured by a front eyelet 26, said strips 25, 25a being somewhat wider than said spring strip 24.

The conductive strip 24 passes rearwardly into the interior of an annular longitudinally slidable plastic insulating ring 27 having a plurality of rows of exterior annular ribs 28 arranged in convex formation, to facilitate the manual sliding of the said ring 27 with respect to the casing 10.

Provision is also made of a pair of rivets 29 and 30 which serve to hold the rear portions of the strips 25, 25a rigidly upon the casing 10, as clearly shown in Fig. 1.

The plastic ring 27 is provided with a short central interior longitudinal groove 31 having a rear bevel portion 32, which when the switch ring 27 is moved forwardly from the position of Fig. 2 to the position of Fig. 3 will contact a hump 40 formed near the end of the spring strip 24 and cause an outwardly offset switch lug 39 on the rear of the spring strip 24 to come into contact with an inwardly bent switch lug 45 struck inwardly from the casing 10, as clearly shown in Fig. 2.

At the opposite portion of the plastic switch ring 27 from the location of the switch strip 24, provision is made of a locking strip 37 having a pair of convex turnpreventing nibs 33, 34, which are adapted to be engaged within a pair of longitudinally spaced slots 35, 36 cut out of the casing 10.

The central portion of the locking strip 37 is secured by a circular eyelet 39a rigidly to the portion of the casing 10 between the slots 35, 36 thereof.

The switch contacts 39 and 45 are located within a rectangular slot 41 cut out from the casing 10, as clearly shown in Figs. 1 and 2 of the drawing.

In order to permit the removal of the switch ring 27 longitudinally from the casing, whenever desired, provision is made in the groove 31 of a transverse bevel 42, as clearly shown in Figs. 5 and 7 of the drawing.

Provision is also made of a pair of short interior transverse locking grooves 46, 47 in the rear portion of the switch ring 27 for selectively receiving the locking nib 33 in its forward "on" position or in its rear "off" position, as shown in Figs. 2 and 3 respectively.

Operation

In the first form of the flashlight herein disclosed, whenever it is desired to remove the plastic ring 27 from the casing, this may be accomplished by first shifting said ring 27 forwardly into the 'on' position, and then twisting it clockwise with respect to the casing. This will cause the lug 34 to be cammed out of the slot 36 by means of the bevel 38 on one side of said slot, as clearly shown in Fig. 6 of the drawing.

Assuming that the slide ring 27 is at its rearmost "off" position, as shown in Fig. 2 of the drawing, when it is desired to place the flashlight in "on" position, it will merely be necessary to push said slide ring manually forwardly by the engagement of the thumb of the operator's hand, at any point along the circumference of said ring, to the "on" position shown in Fig. 3 of the drawing.

At this time, the switch contact lug 39 will be forced against the rear casing switch contact lug 45 of the casing 10 due to the engagement of the switch cam 32 in the interior of the switch ring 27, with the hump 40 of said strip.

It will be understood that the slide ring 27 may be made of any desired insulating material, such as plastic, and of any desired color.

Also the slide ring may be made of less than 360 degrees extent within the spirit and scope of the present invention.

An important advantage of the improved flashlight herein disclosed is that the switch ring 27 may be moved lengthwise with respect to the casing by merely engaging the central convex ribs 28 thereof, by the finger and thumb of the user's hand at any point around the circumference thereof, thus greatly facilitating the operation of the flashlight.

It will be understood that the operation of the switch ring will also be facilitated because of the fact that pressure may be applied by both the finger and thumb at opposite sides of said ring simultaneously.

There will thus be no difficulty encountered in searching for the switch button that formerly was always located on one side of the circumference of the flashlight casing and which was designed to be pushed only by the thumb of the user's hand.

In other words, with the present invention, the flashlight switch is very easy to operate, as the slide ring may be moved by the balanced forces applied at opposite sides of said ring by the finger and thumb operating together.

Second form

In the second form of the invention shown in Figs. 8 and 9, the flashlight is similar to that shown in Form A (Figs. 1–7) in all respects, except that the switch ring 50 is provided with an interior slot 51 located nearer the rear of the switch ring than is the case with the first form of the invention.

An inclined cam 52, in this form, is located in the forward portion of the slot 51, so that the switch contacts 39, 45 will be caused to engage each other to close the circuit through the lamp bulb by pushing the switch ring rearwardly to cause the engagement of the cam 52 with the hump 40 at the rear portion of the spring strip 24. The locking mechanism at the opposite side of the switch ring is identical with that of the first form.

Third form

In the modified form of the invention shown in Figs. 10–14, the switch ring 60 is similar to that shown in the first form (Figs. 1–7) with the exception that a small hole 62 extends through the switch ring 60.

In operation, by inserting a small pointed tool 63 through the hole 62, the locking lug 34 may be forced inwardly out of the groove 36 to permit the transverse rotation of the plastic switch ring 60 to unlocked position, after which the switch ring 60 may thereafter be moved longitudinally off of the casing.

Fourth form

The fourth form of the flashlight, herein disclosed in Figs. 15 and 16, is similar to the first three forms in all respects except that the rear of the spring switch strip normally tends to make contact with the casing so as to keep the switch in "on" position. The sliding of the switch forwardly on the casing from the position shown in Fig. 15, to that shown in Fig. 16, will permit the convex section of said switch strip to move outwardly into the groove in the interior of the plastic switch ring to electrically engage the casing and close the circuit.

In this form of the invention, the casing 10 is provided with a head 11 having a bezel screw ring 12, a crystal 13, a plastic reflector 14, dry cells 20, and a cupped metallic shell 22, as in the first three forms of the invention.

Provision is also made of a spring switch strip 24 having an outcurled forward end 24a engaging the shell 22. The spring strip 24 is supported, as before, between a pair of insulating strips 25, 25a secured to said strip by an eyelet 26.

A plastic switch ring 27a, similar with that shown in the first form of the invention, is employed, and includes a plurality of annular exterior ribs 28, and an interior groove 31a provided with a forward bevel 32a.

The spring strip 24 is provided with an inwardly offset lug 39b at its rear end, which is normally urged into contact with the shell 10 at the rear end of a rectangular slot 41 formed in the casing 10, within the plastic switch ring 27a.

The switch strip 24 is provided with an outwardly extending convex section 40, located within the slot 31a of the switch ring 27a, and is adapted to be cammed into "off" position inwardly by the bevel 32a, when the switch ring is moved from the position shown in Fig. 16 to that shown in Fig. 15.

In operation, when the switch ring 27a is in the rearmost position as shown in Fig. 15, the bevel 32a will engage the convex section 40 and maintain the switch in open position, so that the flashlight will be "off."

When the switch ring 27a is moved forwardly to the "on" position shown in Fig. 16, the bevel 32a will be disengaged from the convex section 40 and will permit the rear contact 39b to move into contact with the casing 10 to "on" position.

While there has been disclosed in this specification four forms in which the invention may be embodied, it is to be understood that these forms are shown for the purpose of illustration only, and that the invention is not limited to the specific disclosures but may be modified and embodied in various other forms without departing from its spirit. In short, the invention includes all the modifications and embodiments coming within the scope of the following claims.

Having thus fully described the invention, what is claimed as new, and for which it is desired to secure Letters Patent is:

1. In a flashlight, a cylindrical metallic casing containing a battery and having a concave reflector adjacent the forward end thereof, a lamp bulb mounted in said reflector having a center terminal electrically connected to said casing through said battery, means connecting said casing to the outer terminal of said bulb to complete the circuit therethrough comprising a substantially cylindrical switch ring surrounding said casing and slidable longitudinally thereon, said switch ring being constructed of insulating material and having a convex exterior finger-engaging surface, said ring having an interior groove provided with an end shoulder, a longitudinally extending resilient conductive strip located within said casing electrically connected at its forward end to the outer shell terminal of said bulb, and having its rear end extending out through an aperture in said casing, said casing having an inwardly extending contact lug in alignment with the rear end of said resilient strip, whereby the sliding of said ring will cause the shoulder of said groove to force the rear end of said strip into contact with said casing lug to complete the circuit and energize said bulb, said switch ring being also provided with a pair of interior locking transverse grooves, and an interior locking strip mounted on said casing having an inturned lug for selective engagement with said grooves to hold said ring either in "on" or "off" positions, respectively.

2. In a flashlight, a tubular casing adapted to contain a battery and having a lamp bulb and reflector mounted at one end, means to control a circuit for said lamp bulb and said battery including a flexible member in said casing having a portion projecting exteriorly through an opening provided in the side of said casing, a tubular switch ring slidable on the exterior of said casing over said opening, the interior of said switch ring being provided with a radially outwardly directed recess to receive said projecting portion of said flexible member in an outwardly flexed position, one side of said recess being bevelled longitudinally of the axis of said casing for camming said projected member inwardly by longitudinal movement of said switch ring, a flexible detent member attached to said casing and coacting with said switch ring to limit longitudinal movement of the switch ring, and means on said switch ring to release said detent to remove said switch ring from said casing.

3. In a flashlight, a tubular casing having a tubular switch ring slidably mounted thereon, a flexible detent member attached to said casing, the interior of said switch ring being provided with a plurality of axially spaced detent receiving recesses adapted to coact with said detent member to yieldably position said switch ring in a plurality of axially displaced locations, a flexible locking element attached to said casing and coacting with said switch ring to limit axial movement of said switch ring, and means on said switch ring to release said detent member to remove said switch ring from said casing.

4. In a molded tubular switch ring for a flashlight having a plurality of outwardly projecting inwardly yieldable elements including a circuit controlling element and axial movement limiting element, said switch ring having a generally smooth interior surface, at least a portion of said interior surface being recessed to receive said outwardly projecting elements, said recessed portion including a plurality of cam surfaces for said yieldable elements, one of said cam surfaces being longitudinally directed to move one of said yieldable elements by axial movement of the switch ring, and another of said cam surfaces being annularly directed to move another of said yieldable elements by rotation of said switch ring.

5. In a flashlight having a tubular casing and a switch member exteriorly slidable thereon, said casing having two axially spaced openings in the side thereof, a flexible detent member attached medially of its ends to said casing between said openings, the ends of said member projecting outwardly through said respective openings, said switch member being provided with a first recess having substantially radial spaced end walls to be alternately engaged by one end of said detent member to limit axial movement thereof, said switch member having at least one other recessed portion to yieldably position said switch member within said limits of axial movement, and means on said switch ring to inwardly deflect said one end of the detent member to remove said switch member from said casing.

6. The invention as defined in claim 5, wherein said last mentioned means include an annularly directed cam surface provided in said first recessed portion.

7. The invention as defined in claim 5, wherein said last mentioned means includes an aperture extending radially through said switch member to receive a tool to deflect said detent member.

8. In a flashlight having a cylindrical casing, a molded plastic switch ring, said casing being provided with an outwardly-projecting inwardly-yieldable circuit controlling element, an outwardly-projecting inwardly-movable switch ring positioning element, and an outwardly-projecting inwardly-movable axial movement limiting element, said switch ring comprising an annular member having a generally smooth interior surface embracing the cylindrical surface of said flashlight casing, a first portion of said interior surface being recessed to receive said circuit controlling element, said first recessed portion also including a cam surface for engaging said circuit controlling element, a second portion of said interior surface being recessed to receive said switch ring positioning element, said second recessed portion having axially spaced cam surfaces selectively engageable with said switch ring positioning element, a third portion of said interior surface being recessed to receive said axial movement limiting element, said third recessed portion having radially directed end walls for alternate engagement with said axial movement limiting element, and means to permit said axial movement limiting element to be moved inwardly to allow removal of said switch ring from said casing.

9. The invention as defined in claim 8, wherein said last mentioned means includes an annularly directed cam surface in said third recessed portion.

10. The invention as defined in claim 8, wherein said last mentioned means includes an aperture extending radially through said annular member to receive a tool to deflect said axial movement limiting element.

References Cited in the file of this patent

UNITED STATES PATENTS

| 1,207,623 | Recker | Dec. 5, 1916 |
| 1,802,712 | Graubner | Apr. 28, 1931 |
| 1,590,624 | Hendry et al. | June 29, 1926 |
| 2,226,353 | Wood | Dec. 24, 1940 |
| 2,326,607 | Bohner | Aug. 10, 1943 |

FOREIGN PATENTS

| 375,274 | Great Britain | Aug. 10, 1943 |